(12) United States Patent
Uniat

(10) Patent No.: US 11,332,644 B2
(45) Date of Patent: May 17, 2022

(54) METHOD AND ARTICLES OF MANUFACTURE FOR MASKING IRREGULAR OR CURVED BOUNDARIES

(71) Applicant: Mark Uniat, Los Gatos, CA (US)

(72) Inventor: Mark Uniat, Los Gatos, CA (US)

(*) Notice: Subject to any disclaimer, the term of this patent is extended or adjusted under 35 U.S.C. 154(b) by 67 days.

(21) Appl. No.: 16/654,842

(22) Filed: Oct. 16, 2019

(65) Prior Publication Data

US 2021/0115307 A1 Apr. 22, 2021

(51) Int. Cl.
| | |
|---|---|
| *C09J 5/00* | (2006.01) |
| *C09J 7/38* | (2018.01) |
| *B05B 12/24* | (2018.01) |
| *C09J 7/21* | (2018.01) |
| *C09J 7/22* | (2018.01) |
| *C09J 7/28* | (2018.01) |

(52) U.S. Cl.
CPC ............... *C09J 7/38* (2018.01); *B05B 12/24* (2018.02); *C09J 7/21* (2018.01); *C09J 7/22* (2018.01); *C09J 7/28* (2018.01); *C09J 2203/31* (2013.01); *C09J 2400/163* (2013.01); *C09J 2400/226* (2013.01); *C09J 2400/263* (2013.01); *C09J 2400/283* (2013.01)

(58) Field of Classification Search
CPC ....... B05D 1/325; B05B 12/24; C09J 2203/31
See application file for complete search history.

(56) References Cited

U.S. PATENT DOCUMENTS

| | | | | |
|---|---|---|---|---|
| 3,368,669 A | * | 2/1968 | Anderson | B05B 12/24 206/820 |
| 5,153,043 A | | 10/1992 | Wang | |
| 5,281,456 A | * | 1/1994 | Botsolas | F16L 59/16 428/40.6 |
| 5,441,769 A | * | 8/1995 | Ross | B05B 12/24 427/284 |
| 5,464,692 A | | 11/1995 | Huber | |
| 5,627,763 A | | 5/1997 | Carlson | |
| 5,658,632 A | * | 8/1997 | Krabill | C09J 7/22 428/43 |
| 6,296,904 B1 | | 10/2001 | Zimmermann | |
| 6,444,307 B1 | | 9/2002 | Tuoriniemi | |
| 7,638,015 B2 | | 12/2009 | Schnoebelen | |
| 8,517,852 B1 | | 8/2013 | Hilton | |
| 9,550,921 B2 | | 1/2017 | Clarke | |
| 2003/0126817 A1 | * | 7/2003 | Gleeson | B32B 13/02 52/471 |
| 2004/0241387 A1 | * | 12/2004 | Lian | B05C 21/005 428/121 |
| 2008/0244867 A1 | * | 10/2008 | Tuell | E05D 11/00 16/250 |
| 2018/0029820 A1 | * | 2/2018 | Davidson | B65H 35/0033 |

FOREIGN PATENT DOCUMENTS

| | | | |
|---|---|---|---|
| CN | 203095959 | * | 7/2013 |
| JP | 61296080 A | * | 12/1986 |

* cited by examiner

*Primary Examiner* — Nathan H Empie
(74) *Attorney, Agent, or Firm* — Stephen C. Macevicz

(57) ABSTRACT

The invention is directed to masking tapes comprising reference lines that facilitate the use of adjacent edges or other linear features to place masking tape edges on irregular or curved boundaries between surfaces.

5 Claims, 3 Drawing Sheets

METHOD AND ARTICLES OF MANUFACTURE FOR MASKING IRREGULAR OR CURVED BOUNDARIES

BACKGROUND

Masking products and other covers are widely used in modern day painting. In many instances, painting is conducted in conjunction with the use of masking products, paint masks, and other paint covers, such as tapes, which facilitate protecting surfaces and areas from unwanted paint during a painting operation. Such masking become difficult or impossible when adjoining surfaces have irregular or curved boundaries, such is often the case in older homes and buildings where joints and abutting materials are heavily caulked, puttied, or otherwise not well-fitted to one another.

In view of the above, it would be advantageous to painting tasks if tapes and methods were available that facilitated the masking of surfaces with irregular or curved boundaries.

SUMMARY OF THE INVENTION

The present invention is directed to methods and articles of manufacture, more particularly, tapes, that facilitate the use of adjacent edges or other linear features to place masking tape edges on irregular or curved boundaries between surfaces.

In some embodiments, the invention is directed to masking tapes comprising: (a) an elongated planar material that is flexible and substantially inelastic, the elongated planar material having a uniform width that defines two edges and a longitudinal dimension parallel to the two edges, the elongated planar material further having an adherent side and a nonadherent side; and (b) at least one reference line on the nonadherent side of the elongated planar material parallel to the edges such that each reference line is a predetermined distance from an edge.

In some embodiments, the invention is directed to methods of using the article described above to mask a surface having an irregular or curved boundary, wherein such methods comprise the steps of: (a) providing a masking tape comprising an elongated planar material that is flexible and substantially inelastic, the elongated planar material having a uniform width that defines two edges and a longitudinal dimension parallel to the two edges, the elongated planar material further having an adherent side and a nonadherent side and at least one reference line on its nonadherent side parallel to the edges such that each reference line is a predetermined distance from an edge; (b) aligning the reference line of the masking tape with a linear feature adjacent to and substantially parallel with the irregular boundary to be masked, wherein the predetermined distance of the reference line from an edge is selected to be substantially the same as the distance of the linear feature from the irregular boundary; and (c) pressing the aligned masking tape to the surface.

DETAILED DESCRIPTION OF THE INVENTION

Figure 1:
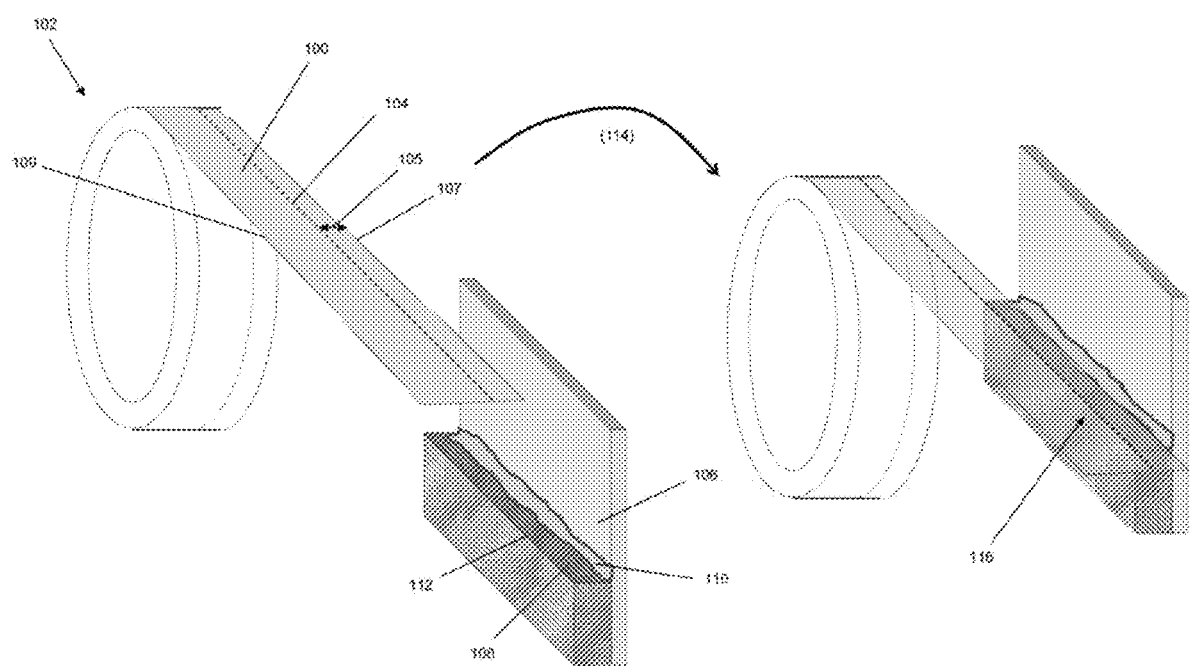
FIG. 1 illustrates the use of one embodiment of the invention to mask a surface having an irregular boundary.

The general principles of the invention are disclosed in more detail herein particularly by way of examples, such as those shown in the drawings and described in detail. It should be understood, however, that the intention is not to limit the invention to the particular embodiments described. The invention is amenable to various modifications and alternative forms, specifics of which are shown for several embodiments. The intention is to cover all modifications, equivalents, and alternatives falling within the principles and scope of the invention.

Figure 3:
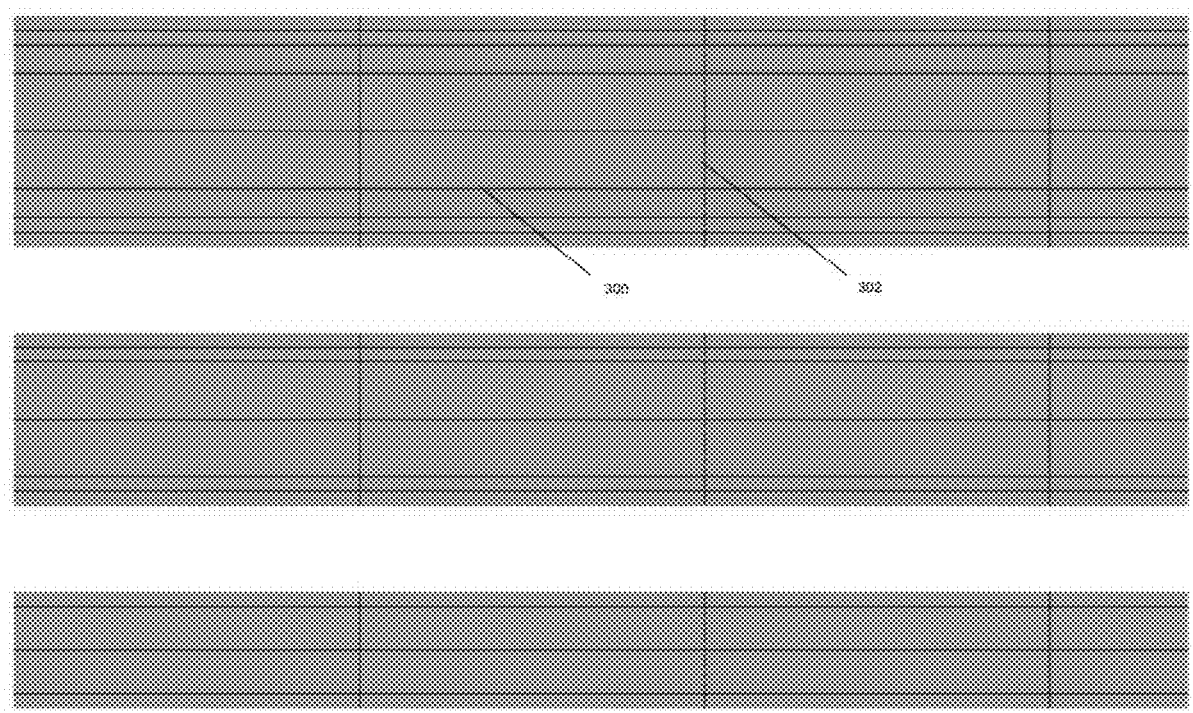
FIG. 3 illustrates various symmetric reference line arrangements on masking tapes of the invention.

The invention is directed to masking tapes comprising reference markings running lengthwise on a tape which may be used to align the tape with a linear feature, such as an edge, on a surface to be masked which, in turn, positions the edge of the tape at a desired location on the irregular or curved boundary. The embodiment illustrated in FIG. 1 exemplifies one aspect of the invention. Here surface (108) is to be masked, surface (106) is to be painted or treated, and boundary (110) between the two surfaces is irregular, such as may occur when a boundary has been caulked. Edge (112) is adjacent to and parallel with boundary (110). A well-defined border can be established by the masking tape (100) by aligning reference line (104) with edge (112). In some embodiments, as described further below, tape (100) is selected with reference line (105) having a predetermined distance (105) to tape edge (107). (in other embodiments, a reference line need not have a predetermined distance from the tape edge, but it must at least be parallel to a tape edge. In alternative embodiments, a reference line may be at a predetermined angle with the tape edge, e.g. 45°—for example, where an edge used for reference is at a 45° or 135° angle to a boundary to be masked. In other words, a reference line may intersect at a predetermined angle the line defined by a tape edge). Such predetermined distances may correspond to standard material widths, such as, $\frac{1}{16}$, $\frac{1}{8}$, $\frac{1}{4}$, $\frac{1}{2}$ inch or the like. A single tape of course may contain a plurality of parallel reference lines corresponding to distances from tape edge (107), such as illustrated in FIG. 3. Thus, by selecting a reference line (104) with the appropriate distance from tape edge (107) and aligning (116) reference line (104) with edge (112) a well-defined masking border (or boundary) can be established on irregular surface or boundary (110). Multiple reference lines may be oriented symmetrically on a tape (as illustrated in FIG. 3) or asymmetrically, so that (for example) the closest reference line from a first edge of a tape may have a perpendicular distance of $\frac{1}{8}^{th}$ inch from the tape edge while the closest reference line from a second edge of a tape may have a perpendicular distance of $\frac{1}{4}^{th}$ inch from the tape edge. Reference lines of a tape may be distinct lines printed or inked on the non-adhesive side of a tape, or reference lines may be the boundaries of different colored regions of a tape. In some embodiments, a tape may be transparent or translucent to aid in the alignment of a reference line with an edge. In some embodiments, reference lines may comprise a line of perforations which allow both for alignment of a tape edge with a boundary and aid in bending or creasing of a tape to conform with the geometry of an edge.

The number of reference lines on a tape may vary widely. In some embodiments, the number of reference lines are in the range of from 1 to 7; in other embodiments there is a plurality of reference lines less than or equal to 8.

Figure 2:
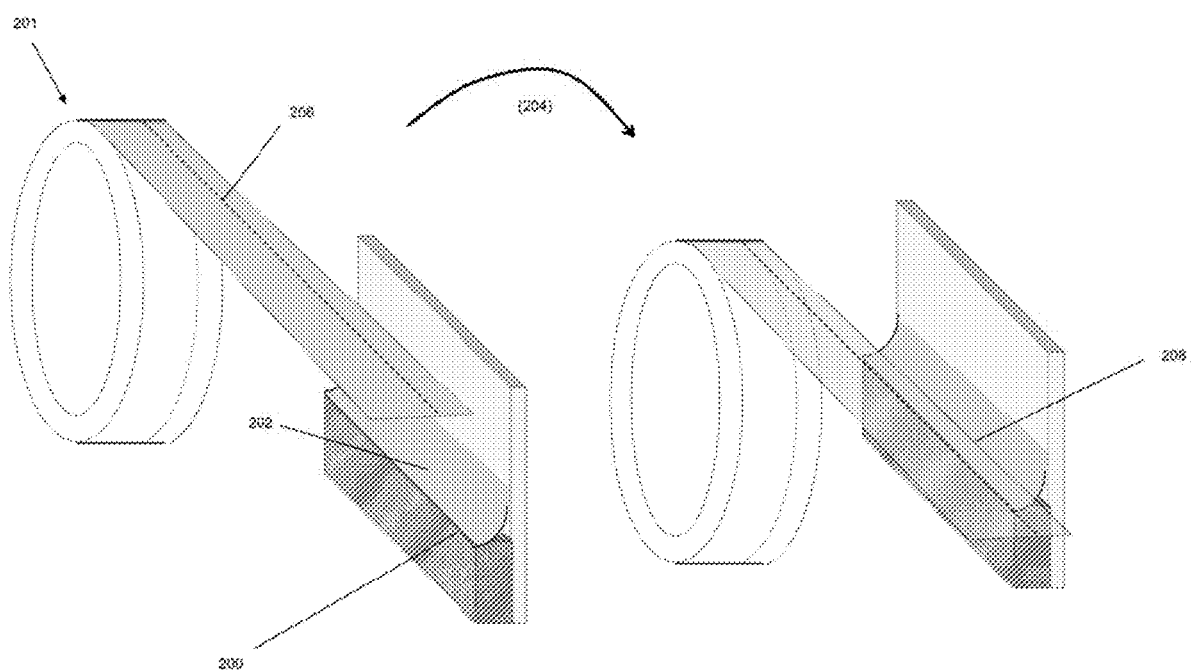
FIG. 2 illustrates the use of one embodiment of the invention to mask a surface having a curved boundary.

In some applications, a tape of the invention may be used to mask a curved surface as illustrated in FIG. 2. Reference line (206) of tape (201) is aligned (204) with edge (200) so that tape edge (210) establishes a masking boundary (208) on curved surface (202).

As mentioned above, FIG. 3 illustrates tapes of the invention with different widths and with different pluralities of reference lines (300, for example) arranged symmetrically at different predetermined distances from each edge of the tape. Tapes of the invention may also include lines (302) running perpendicular to reference lines (3)) and spaced at regular intervals to calibrate lengths of the tape.

Tape Materials and Adhesives

Tapes may comprise a wide variety of materials which are bendable, but substantially rigid or inelastic, and can be inscribed with reference lines and accept adhesive coatings on at least one surface. Such materials include, but are not limited to, planar compositions of papers, polymeric materials (such as plastics), woven or non-woven fabrics, metal foils, and the like. As mentioned above, reference lines may be inked or printed on a surface of a tape, or reference lines may be formed by a line of perforations, which are especially useful for opaque tape materials, such as, metal foils.

A wide variety of adhesives are applicable for masking tape applications. These adhesives are generally pressure sensitive adhesives. The term "pressure-sensitive adhesive" refers to an adhesive that in solvent-free form are aggressively tacky at room temperature and would adhere to a surface on contact. Normally only very slight pressure is adequate for applying a pressure sensitive adhesive to a surface to obtain good adhesion. A suitable pressure sensitive adhesive may be based on natural or synthetic rubber. One requirement of a pressure sensitive adhesive for use as a masking tape, for example, which is applicable for painting automobiles, is that after the painting operation is finished, the masking tape can be removed without the damaging the coating of paint. An undesirable property of a pressure sensitive is build up, which is an adhesion increase over time. Build up might result in a difficulty in removing the masking tape after the masking tape has stayed on a surface for a period of time. For example, if a masking tape is applied to a painted surface, and the buildup is strong enough, it may not be possible to remove the masking tape without damaging the coating of paint underneath the masking tape. Another type of pressure sensitive adhesive that is applicable for a masking tape adhesive are the "acrylate" adhesives, examples of which are the isoctyl acrylate/acrylic acid copolymer and isoctyl acrylate/acrylamide copolymer. Other examples of pressure sensitive adhesives are copolymers of vinyl monomers such as a non-tertiary alkyl acrylate and zwitterionic monomer.

This disclosure is not intended to be limited to the scope of the particular forms set forth, but is intended to cover alternatives, modifications, and equivalents of the variations described herein. Further, the scope of the disclosure fully encompasses other variations that may become obvious to those skilled in the art in view of this disclosure. The scope of the present invention is limited only by the appended claims.

What is claimed is:

1. A method of masking a surface having a caulked boundary, the method comprising the steps of:
providing a masking tape comprising an elongated planar material that is flexible and inelastic, the elongated planar material having a uniform width that defines two edges and a longitudinal dimension parallel to the two edges, the elongated planar material further having an adherent side and a nonadherent side and at least one reference line on its nonadherent side parallel to the edges such that each reference line is a predetermined distance from an edge;
aligning the reference line of the masking tape with a linear feature adjacent to and substantially parallel with the caulked boundary to be masked, wherein the predetermined distance of the reference line from an edge is selected to be substantially the same as the distance of the linear feature from the caulked boundary so that the edge of the masking tape is positioned at a desired location on the caulked boundary; and
pressing the aligned masking tape to the surface.

2. The method of claim 1 wherein said at least one reference line comprises a line of perforations or comprises a printed line.

3. The method of claim 1 wherein said planar material comprises paper, a polymeric material, a woven or non-woven fabric, or a metal foil.

4. The method of claim 3 wherein said planar material is impermeable to water- or oil-based liquids or is coated to be impermeable to water- or oil-based liquids.

5. The method of claim 1 wherein said planar material has a thickness in the range of from 1 to 10 mils and a width in the range of from 0.5 to 4.0 inches.

* * * * *